E. R. COVERDILL.
MECHANISM FOR OPERATING DOFFER-COMBS.
No. 190,744. Patented May 15, 1877.
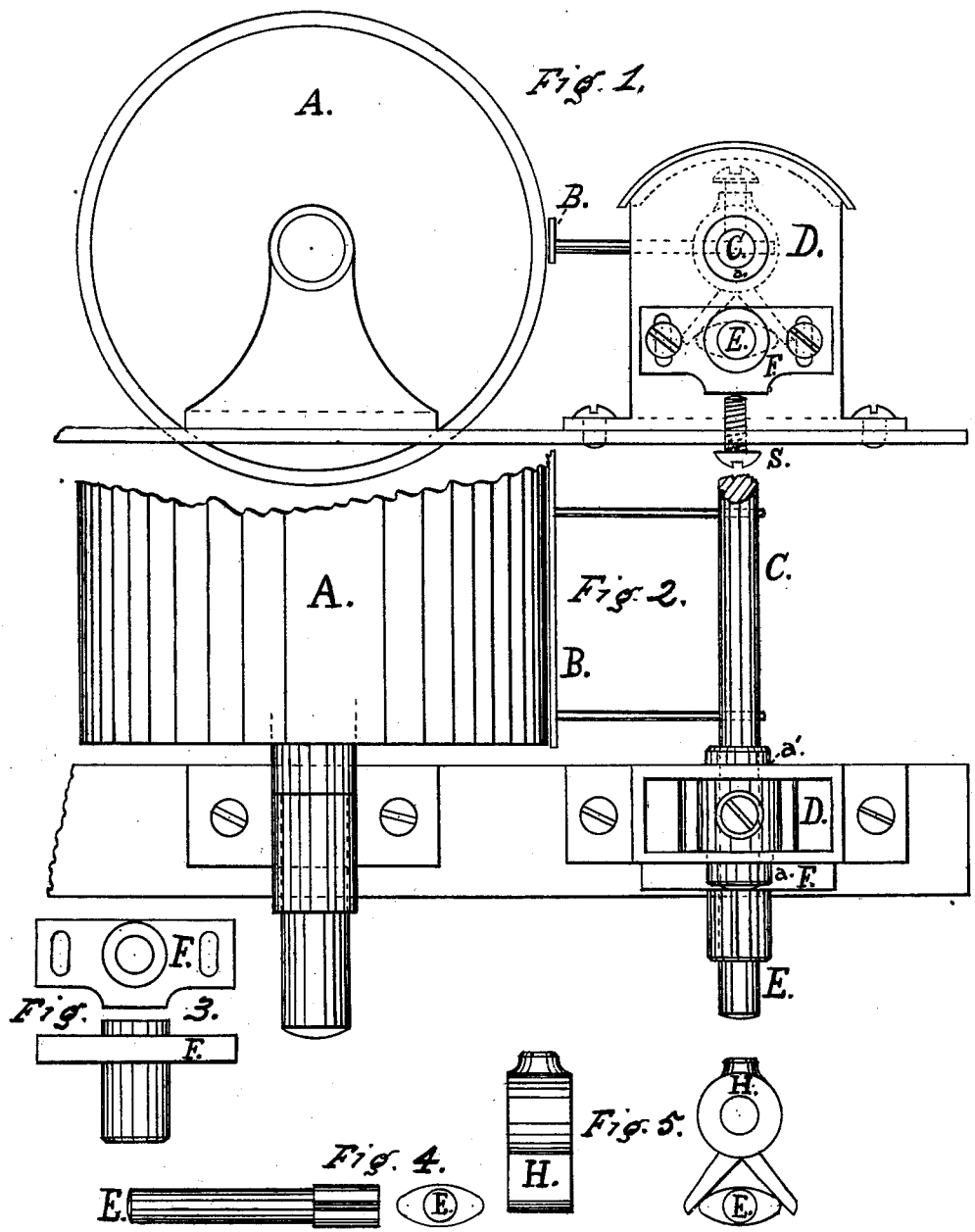

UNITED STATES PATENT OFFICE.

EDWARD R. COVERDILL, OF DARBY, PENNSYLVANIA.

IMPROVEMENT IN MECHANISMS FOR OPERATING DOFFER-COMBS.

Specification forming part of Letters Patent No. 190,744, dated May 15, 1877; application filed February 2, 1877.

*To all whom it may concern:*

Be it known that I, EDWARD R. COVERDILL, of Darby, in the county of Delaware and State of Pennsylvania, have invented a new and useful Improvement in Mechanism for Operating the Comb on Carding-Machines, which improvement is fully set forth in the following specification and accompanying drawings, in which—

Figure 1 is an end view of a card-doffer cylinder, and of the mechanism for producing a comb-motion according to my improvement. Fig. 2 is a top view of the same. Fig. 3 is a view of the adjustable cam-shaft box or bearing. Fig. 4 is a view of shaft and elliptical cam. Fig. 5 is a view of the yoke and elliptical cam.

Similar letters in the drawings refer to like parts.

The object of my invention is the construction of mechanism for producing a comb-motion for carding-machines that will be simple, durable, cheap, and capable of being operated at a high rate of speed; and consists, in combination with the comb-shaft, of a yoke with arms formed at right angles, and operated by a cam elliptical in form, as will be hereafter described.

Referring to the drawings, A represents the doffer-cylinder; B, the comb, and C the comb-shaft. These are all constructed in the usual manner. D is a cast-iron box, open at the top, and provided with a removable cover. This box is cast with two hubs, $a$ $a'$. (See Fig. 2.) In practice the hub $a$ will be drilled only partly through and from the inside. F represents the adjustable journal-box or bearing for the cam-shaft E. This bearing is constructed with a hub on each side, and is provided with two slots. (See Fig. 3.) This stand or journal-bearing is fastened to the box D by screws, making an oil-tight joint the short hub of the bearing fitting into a hole in the side of the box D, and through which hole the cam is passed into the box D. The bearing is made adjustable by the screw S. (See Fig. 1.) H is the yoke, and is constructed in form as shown in Fig. 5, the two arms forming a right angle, and the hub having a boss for a set-screw. E is the cam and cam-shaft. This cam is made in form of an ellipse. The cam-shaft and yoke may be cast in iron, brass, steel, or gun-metal. On shaft E will be fastened the driving-pulley, which, in practice, should be a grooved cone-pulley, as comb-motions are usually driven by a cord.

The operation is as follows: Motion is communicated to the pulley that is placed on the shaft E from some fast-moving part of the card. The shaft E revolves the elliptical cam, and this gives an oscillating motion to the yoke H, fastened on the comb-shaft C in the box D, and through this shaft a reciprocating motion will be given to the comb B.

It will be noticed that one revolution of the cam E will give two movements to the comb. As the cam and yoke wear away, the adjustments are made by the regulating-screw S. (See Fig. 1.)

With my improvement I am enabled to operate the comb of a carding-machine at a high rate of speed with little power, and at same time run it noiselessly.

I claim—

The combination of comb-shaft C, yoke H, and elliptical cam E, as described, and for the purpose specified.

E. R. COVERDILL.

Witnesses:
 H. N. MARCUS,
 WM. COVERDILL.